United States Patent
Zhao et al.

(10) Patent No.: US 9,574,878 B2
(45) Date of Patent: Feb. 21, 2017

(54) TERMINAL DEVICE HAVING HAND SHAKING SENSING UNITS TO DETERMINE THE MANNER THAT A USER HOLDS THE TERMINAL DEVICE

(71) Applicant: Lenovo (Beijing) Co., Ltd., Haidian District, Beijing (CN)

(72) Inventors: Qian Zhao, Beijing (CN); Hanfeng Zheng, Beijing (CN); Hao Chen, Beijing (CN); Yufei Zhang, Beijing (CN); Chenghu Wu, Beijing (CN); Tao Cheng, Beijing (CN); Xiaofei Xu, Beijing (CN); Xiaoming Liu, Beijing (CN)

(73) Assignee: LENOVO (BEIJING) CO., LTD., Haidan District, Beijing (CN)

( * ) Notice: Subject to any disclaimer, the term of this patent is extended or adjusted under 35 U.S.C. 154(b) by 261 days.

(21) Appl. No.: 13/942,817

(22) Filed: Jul. 16, 2013

(65) Prior Publication Data

US 2014/0013844 A1      Jan. 16, 2014

(30) Foreign Application Priority Data

Jul. 16, 2012  (CN) .......................... 2012 1 0246742

(51) Int. Cl.
*G01C 19/42*   (2006.01)
*G01P 15/18*   (2013.01)
(Continued)

(52) U.S. Cl.
CPC ........... *G01C 19/42* (2013.01); *G01C 19/5783* (2013.01); *G01P 15/18* (2013.01); *G06F 3/0346* (2013.01)

(58) Field of Classification Search
CPC ........ G01C 19/42; G01P 15/18; G06F 3/0346; G06F 1/1694
(Continued)

(56) References Cited

U.S. PATENT DOCUMENTS 7,907,838 B2   3/2011  Nasiri
8,351,773 B2   1/2013  Nasiri
(Continued)

FOREIGN PATENT DOCUMENTS

CN    101648076       2/2010
CN    102232211 A    11/2011
(Continued)

OTHER PUBLICATIONS

Strachan et al, Muscle Tremor as an Input Mechanism, 2004.*
(Continued)

*Primary Examiner* — Michael A Lyons
*Assistant Examiner* — David L Singer
(74) *Attorney, Agent, or Firm* — Brinks Gilson & Lione; G. Peter Nichols

(57) ABSTRACT

A terminal device is described that includes a housing configured to accommodate various components of the terminal device; a first sensing unit configured to collect first status information of the terminal device; a second sensing unit configured to collect second status information of the terminal device; and a processing unit configured to determine a manner that a user holds the terminal device based on the first status information and the second status information.

4 Claims, 1 Drawing Sheet

(51) Int. Cl.
*G01C 19/5783* (2012.01)
*G06F 3/0346* (2013.01)

(58) Field of Classification Search
USPC .............................. 73/504.08, 504.02, 504.03
See application file for complete search history.

(56) References Cited

U.S. PATENT DOCUMENTS

| | | | |
|---|---|---|---|
| 8,462,109 B2 | 6/2013 | Nasiri | |
| 8,665,238 B1* | 3/2014 | Gossweiler, III | G06F 3/0488 345/173 |
| 8,760,426 B1* | 6/2014 | Strand | G09G 5/00 345/169 |
| 9,292,102 B2 | 3/2016 | Nasiri | |
| 2003/0103038 A1* | 6/2003 | Wong | G06F 1/1626 345/158 |
| 2003/0234797 A1* | 12/2003 | Williams et al. | 345/649 |
| 2004/0145613 A1* | 7/2004 | Stavely et al. | 345/863 |
| 2009/0265671 A1 | 10/2009 | Sachs | |
| 2010/0013780 A1* | 1/2010 | Ikeda | G06F 3/04883 345/173 |
| 2010/0056224 A1* | 3/2010 | Kim | 455/566 |
| 2010/0097331 A1* | 4/2010 | Wu | G06F 3/0488 345/173 |
| 2010/0134423 A1* | 6/2010 | Brisebois | G06F 3/03547 345/173 |
| 2010/0138766 A1* | 6/2010 | Nakajima | 715/767 |
| 2010/0257251 A1* | 10/2010 | Mooring et al. | 709/216 |
| 2011/0159915 A1* | 6/2011 | Yano | G06F 1/1626 455/550.1 |
| 2012/0078570 A1* | 3/2012 | Rothkopf et al. | 702/141 |
| 2012/0206319 A1* | 8/2012 | Lucero et al. | 345/1.3 |
| 2012/0270605 A1* | 10/2012 | Garrone | H04M 1/72563 455/566 |
| 2012/0281015 A1* | 11/2012 | Griffin | 345/629 |
| 2012/0324381 A1* | 12/2012 | Cohen | G06F 3/04886 715/765 |
| 2013/0019192 A1* | 1/2013 | Itoh | G06F 3/0346 715/765 |
| 2013/0111384 A1* | 5/2013 | Kim | G06F 3/048 715/765 |
| 2013/0120464 A1* | 5/2013 | Wei et al. | 345/672 |
| 2013/0197681 A1* | 8/2013 | Alberth, Jr. | G06F 1/163 700/94 |
| 2013/0252736 A1* | 9/2013 | Akifusa | A63F 13/06 463/37 |
| 2014/0092040 A1* | 4/2014 | Nagao | G06F 1/1694 345/173 |
| 2014/0232653 A1* | 8/2014 | Yagihashi | G06F 3/0416 345/158 |

FOREIGN PATENT DOCUMENTS

| | | |
|---|---|---|
| CN | 102246125 | 11/2011 |
| CN | 102265242 | 11/2011 |
| CN | 102647500 A * | 8/2012 |

OTHER PUBLICATIONS

First Office Action dated Jan. 21, 2016 out of corresponding Chinese Priority Application No. 201210246742.3 (9 pages including English translation).

Second Office Action dated Sep. 26, 2016 out of corresponding Chinese Priority Application No. 201210246742.3 (10 pages including English translation).

* cited by examiner

TERMINAL DEVICE HAVING HAND SHAKING SENSING UNITS TO DETERMINE THE MANNER THAT A USER HOLDS THE TERMINAL DEVICE

BACKGROUND

This application claims priority to Chinese patent application No. CN CN201210246742.3 filed on Jul. 16, 2012, the entire contents are incorporated herein by reference.

The present invention relates to a terminal device, and more particularly, to a terminal device capable of identifying a manner that a user holds the terminal device.

At present, more and more users start to use terminal devices such as large-screen mobile phones, tablet PCs or the like. Generally, multiple application icons or multiple virtual keys are provided on touch screens of such terminal devices. In this case, if a user holds a terminal device with one hand (left hand or right hand), the user usually has to use the other hand to operate these application icons or virtual buttons. In this case, if the user's holding manner can be determined and these application icons or virtual buttons can be rearranged based on the user's holding manner, user experience can be improved effectively.

SUMMARY

To solve the above technical problem in the prior art, according to one aspect of the present invention, there is provided a terminal device, comprising: a housing configured to accommodate various components of the terminal device; a first sensing unit configured to collect first status information of the terminal device; a second sensing unit configured to collect second status information of the terminal device; and a processing unit configured to determine a manner that a user holds the terminal device based on the first status information and the second status information.

In addition, according to one embodiment of the present invention, wherein the first sensing unit is a first gravity sensor provided at a first position within the housing, and the first status information is first acceleration information detected by the first gravity sensor; and the second sensing unit is a second gravity sensor provided at a second position within the housing, and the second status information is second acceleration information detected by the second gravity sensor.

In addition, according to one embodiment of the present invention, wherein the processing unit determines the manner that the user holds the terminal device based on the first acceleration information and the second acceleration information.

In addition, according to one embodiment of the present invention, wherein when determining the manner that the user holds the terminal device, the processing unit further determines a using state of the terminal device, and further determines the manner that the user holds the terminal device based on the using state.

In addition, according to one embodiment of the present invention, wherein the first sensing unit is a first gyroscope provided at a first position of the housing, and the first status information is first angular velocity information detected by the first gyroscope; and the second sensing unit is a second gyroscope provided at a second position of the housing, and the second status information is second angular velocity information detected by the second gyroscope.

In addition, according to one embodiment of the present invention, wherein the processing unit determines the manner that the user holds the terminal device based on the first angular velocity information and the second angular velocity information.

In addition, according to one embodiment of the present invention, wherein when determining the manner that the user holds the terminal device, the processing unit further determines a using state of the terminal device, and further determines the manner that the user holds the terminal device based on the using state.

Through the ways described above, the status that the user holds the terminal device can be determined based on the first status information and the second status information, thereby display of the application icons or virtual buttons can be optimized based on the state that the user holds the terminal device, so as to further improve user experience.

DETAILED DESCRIPTION

Figure 1:
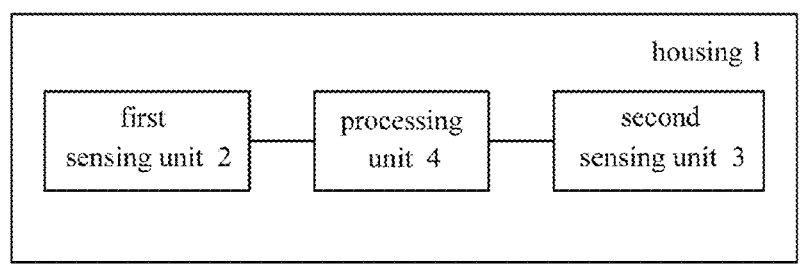
FIG. 1 is a schematic block diagram illustrating a terminal device according to an embodiment of the present invention.

Various embodiments according to the present invention will be described in detail with reference to the drawings. Herein it should be noted that, in the drawings, components having substantially the same or similar structures and functions are endowed with the same reference signs, and repeated descriptions thereof will be omitted.

Hereinafter, a terminal device according to an embodiment of the present invention will be described with reference to FIG. 2. Here, the terminal device according to the embodiment of the present invention may be a terminal device such as a large screen smart mobile phone, a tablet PC or the like.

As shown in FIG. 1, the terminal device according to the embodiment of the present invention may comprise: a housing 1, a first sensing unit 2, a second sensing unit 3, and a processing unit 4.

The housing 1 may be made of any metal or plastic material, and may be used to accommodate various components of the terminal device (e.g., the processing unit 4, the first sensing unit 2, the second sensing unit 3, and other hardware).

The first sensing unit 2 may be embodied by a gravity sensor or a gyroscope, and provided at a first position within the housing 1. According to the embodiment of the present invention, the first sensing unit 2 may be used to collect first status information of the terminal device.

The second sensing unit 3 may be embodied by a gravity sensor or a gyroscope, and provided at a second position within the housing 1. According to the embodiment of the present invention, the second sensing unit 3 may be used to collect second status information of the terminal device.

The processing unit 4 is provided within the housing 1, and may be embodied by any processor or microprocessor. According to the embodiment of the present invention, the processing unit 4 may determine a manner that a user holds the terminal device based on the first status information and the second status information under control of a preset program.

Hereinafter, description will be provided, for example, with the first sensing unit 2 being a first gravity sensor provided at a first position within the housing 1 and the second sensing unit 3 being a second gravity sensor provided at a second position within the housing 1. Here, the gravity sensors may be embodied by three-axis acceleration sensors, which can measure acceleration information of the terminal device in the directions of length, width and thickness.

Figure 2:
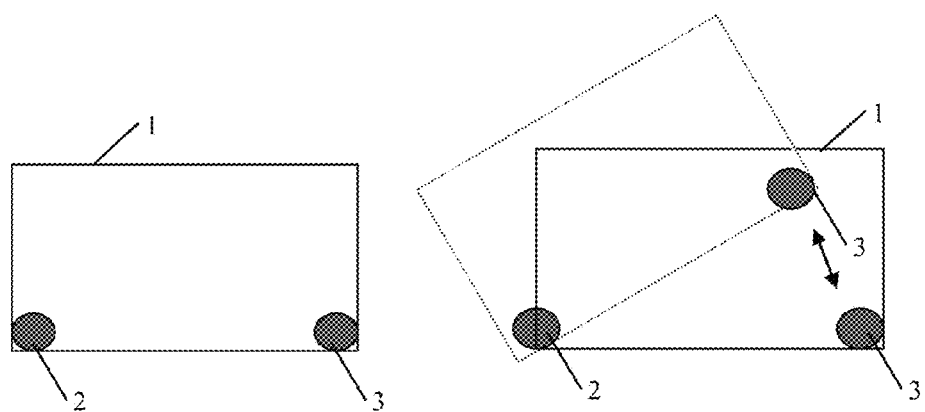
FIG. 2 is a schematic diagram illustrating determining a manner that a user holds the terminal device using a first sensing unit and a second sensing unit.

For example, as shown in FIG. 2, when the terminal device is used laterally, the first sensing unit 2 is provided at the lower left side on a long edge of the housing 1, and the second sensing unit 3 is provided at the lower right side on the long edge of the housing 1. Here, since the first sensing unit 2 and the second sensing unit 3 are the first gravity sensor and the second gravity sensor, respectively, the first status information of the first sensing unit 2 is first acceleration information detected by the first gravity sensor, and the second status information of the second sensing unit 3 is second acceleration information detected by the second gravity sensing unit 3.

In this case, after obtaining the first acceleration information of the first sensing unit 2 and the second acceleration information of the second sensing unit 3, the processing unit 4 may determine the manner that the user holds the terminal device based on the first acceleration information and the second acceleration information. For example, the processing unit 4 may determine the manner that the user holds the terminal device based on a difference between the first acceleration information and the second acceleration information.

For example, when the terminal device is used laterally, if the user holds the terminal device with both hands, since the terminal device is restricted by the user's both hands, amplitudes of vibrations generated by shake of the user's hands at different positions of the terminal device are essentially the same. In this case, an output of the first sensing unit 2 provided at the lower left side on a long edge of the housing 1 (the first acceleration information), and an output of the second sensing unit 3 provided at the lower right side on the long edge of the housing 1 (the second acceleration information) are essentially the same. In this case, the processing unit 4 may obtain the first acceleration information and the second acceleration information, and compare the first acceleration information and the second acceleration information. When the processing unit 4 recognizes that no difference exists between the two or the difference between the two is less than a predetermined threshold value (which is determined based on experimental values), the processing unit 4 may determine that the user is holding the terminal device with both hands.

In addition, when holding the terminal device with the left hand, the user usually holds a left edge of the terminal device. At this time, the terminal device may vibrate due to shake of the user's left hand. Here, since the user holds the left edge of the terminal device, the terminal device will vibrate with the left edge as an axis. In this case, as shown in FIG. 2, since the first sensing unit 2 is close to an origin of the vibration, the output of the first sensing unit 2, i.e., the first acceleration information generated by vibration of the terminal device, has a small change in the vibration direction. Further, since the second vibration sensing unit 3 is far away from the origin or the vibration axis, the output of the second sensing unit 3, i.e., the second acceleration information generated by vibration of the terminal device, has a change larger than that of the first acceleration information in the vibration direction. In this case, if the processing unit 4 determines that the change of the second acceleration information is larger than that of the first acceleration information, the processing unit 4 may determine that the user is holding the terminal device with the left hand.

In addition, when holding the terminal device with the right hand, the user usually holds a right edge of the terminal device. At this time, the terminal device may vibrate due to shake of the user's right hand. Here, since the user holds the right edge of the terminal device, the terminal device will vibrate with the right edge as an axis. In this case, since the second sensing unit 3 is close to an origin of the vibration, the output of the second sensing unit 3, i.e., the second acceleration information generated by vibration of the terminal device, has a small change in the vibration direction. Further, since the first vibration sensing unit 2 is far away from the origin or the vibration axis, the output of the first sensing unit 2, i.e., the first acceleration information generated by vibration of the terminal device, has a change larger than that of the second acceleration information in the vibration direction. In this case, if the processing unit 4 determines that the change of the first acceleration information is larger than that of the second acceleration information, the processing unit 4 may determine that the user is holding the terminal device with the right hand.

In the above, the situation that the first sensing unit 2 is provided at the lower left side on a long edge of the housing 1, and the second sensing unit 3 is provided at the lower right side on the long edge of the housing 1 is described. However, the present invention is not limited thereto. Other positions are also allowed, as long as positions of the first sensing unit 2 and the second sensing unit 3 can be used to determine the holding state of the terminal device. For example, the processing unit 4 can determine the holding state of the terminal device, as long as it is ensured that when the user holds the terminal device with the left hand or right hand, positions of the first sensing unit 2 and the second sensing unit 3 away from the user's left hand or right hand (the vibration origin) are different, because between the first sensing unit 2 and the second sensing unit 3, the output (acceleration information) of the one that is farther away from the vibration origin than the other, changes more largely than the other.

In addition, according to one embodiment of the present invention, when determining the manner that the user holds the terminal device, the processing unit 4 may further determine a using state of the terminal device, and further determine the manner that the user holds the terminal device based on the using state. The above described is an embodiment of determining the user's holding manner when using the terminal device laterally, however, the user may also use the terminal device longitudinally.

In this case, the processing unit 4 may first determine the using state of the terminal device (being used laterally or longitudinally) based on the output of the first sensing unit 2 or that of the second the sensing unit 3. Here, since the technique of determining the using state of the terminal device based on the gravity sensors is well known to those skilled in the art, description thereof is omitted.

Here, in the case that the first sensing unit 2 and the second sensing unit 3 are provided in the manner shown in FIG. 2, if the terminal device is used by the user longitudinally, the first sensing unit 2 is located on the top left on a long edge of the terminal device, and the second sensing unit 3 is located on the bottom left on a long edge of the terminal device. In this case, for example, if the user holds the terminal device with the left hand, the output of the second sensing unit 3 (the second acceleration information) remains unchanged essentially, while the output of the first sensing unit 2 (the first acceleration information) changes largely. In this case, the processing unit 4 may determine that the user is holding terminal device with the left hand based on the first acceleration information of the first sensing unit 2 and the second acceleration information of the second sensing unit 3. Also, when the user holds the terminal device with the right hand, the first acceleration information of the first sensing unit 2 and the second acceleration information of the second sensing unit 3 both change largely (because the first sensing unit 2 and the second sensing unit 3 both are located at the left side). In this case, the processing unit 4 may determine that the user is holding the terminal device with the right hand based on the first acceleration information of the first sensing unit 2 and the second acceleration information of the second sensing unit 3.

Through the ways described above, the state that the user holds the terminal device can be determined based on the first status information (the first acceleration information) and the second state information (the second acceleration information), thereby display of the application icons or virtual buttons can be optimized based on the state that the user holds the terminal device, so as to further improve user experience. For example, when the user holds the terminal device with the left hand, icons or virtual button can be arranged in the lower left corner on the display screen of the terminal device, so that the user can operate the terminal device without using the other hand.

Hereinafter, description will be provided, for example with the first sensing unit 2 being a first gyroscope provided at a first position within the housing 1 and the second sensing unit 3 being a second gyroscope provided at a second position within the housing 1. Here, the gyroscopes can measure angular velocity information of rotation of the terminal device.

For example, as shown in FIG. 2, when the terminal device is used laterally, the first sensing unit 2 is provided at the lower left side on a long edge of the housing 1, and the second sensing unit 3 is provided at the lower right side on the long edge of the housing 1. Here, since the first sensing unit 2 and the second sensing unit 3 are the first gyroscope and the second gyroscope, respectively, the first status information of the first sensing unit 2 is first angular velocity information detected by the first gyroscope, and the second status information of the second sensing unit 3 is second angular velocity information detected by the second gyroscope.

In this case, after the first angular velocity information of the first sensing unit 2 and the second angular velocity information of the second sensing unit 3 are obtained, the processing unit 4 may determine the manner that the user holds the terminal device based on the first angular velocity information and the second angular velocity information.

For example, when the terminal device is used laterally, if the user holds the terminal device with both hands, since the terminal device is restricted by the user's both hands, the terminal device is almost not rotated. In this case, an output of the first sensing unit 2 provided at the lower left side on a long edge of the housing 1 (the first angular velocity information) and an output of the second sensing unit 3 provided at the lower right side on the long edge of the housing 1 (the second angular velocity information) are essentially unchanged. In this case, the processing unit 4 may obtain the first angular velocity information and the second angular velocity information, and compare the first angular velocity information and the second angular velocity information. When the processing unit 4 recognizes that no difference exists between the two or the difference between the two is less than a predetermined threshold value (which is determined based on experimental values), the processing unit 4 may determine that the user is holding the terminal device with both hands.

In addition, when the user holds the terminal device with the left hand, the user usually holds a left edge of the terminal device. At this time, since the user's hand may shake, the terminal device may rotate slightly with the user's left hand as an axis. In this case, as shown in FIG. 2, since the first sensing unit 2 is at an origin of the rotation, the output of the first sensing unit 2, i.e., the first angular velocity information generated by the user's hand shaking, essentially is zero. Further, since the second sensing unit 3 is far away from the origin of rotation or the rotation axis, the output of the second sensing unit 3, i.e., the second angular velocity information, is relatively obvious. In this case, if the processing unit 4 determines that the second angular velocity information is larger than the first angular velocity information, the processing unit 4 may determine that the user is holding the terminal device with the left hand.

In addition, when the user holds the terminal device with the right hand, the user usually holds a right edge of the terminal device. At this time, since the user's hand may shake, the terminal device may rotate slightly with the user's right hand as an axis. In this case, since the second sensing unit 3 is at an origin of the rotation, the output of the second sensing unit 3, i.e., the second angular velocity information generated by the user's hand shaking, essentially is zero. Further, since the first sensing unit 2 is far away from the origin of rotation or the rotation axis, the output of the first sensing unit 2, i.e., the first angular velocity information, is relatively obvious. In this case, if the processing unit 4 determines that the first angular velocity information is larger than the second angular velocity information, the processing unit 4 may determine that the user is holding the terminal device with the right hand.

In addition, when determining the manner that the user holds the terminal device, the processing unit 4 may further determine a using state of the terminal device, and further determine the manner that the user holds the terminal device based on the using state. The above described is an embodiment of determining the user's holding manner when using the terminal device laterally, however, the user may also use the terminal device longitudinally.

In this case, the processing unit 4 may first determine the using state of the terminal device (being used laterally or longitudinally) based on an output of a gravity sensor provided within the terminal device. Here, since the technique of determining the using state of the terminal device based on the gravity sensor is well known to those skilled in the art, description thereof is omitted.

Here, in the case that the first sensing unit 2 and the second sensing unit 3 are provided in the manner shown in FIG. 2, if the terminal device is used by the user longitudinally, the first sensing unit 2 is located on the top left on a long edge of the terminal device, and the second sensing unit 3 is located on the bottom left on a long edge of the terminal device. In this case, for example, if the user holds the terminal device with the left hand, the output of the second sensing unit 3 (the second angular velocity information) is essentially zero, while the output of the first sensing unit 2 (the first angular velocity information) is relatively obvious. In this case, the processing unit 4 may determine that the user is holding terminal device with the left hand based on the first angular velocity information of the first sensing unit 2 and the second angular velocity information of the second sensing unit 3. Also, when the user holds the terminal device with the right hand, the first angular velocity information of the first sensing unit 2 and the second angular velocity information of the second sensing unit 3 both are obvious (because the first sensing unit 2 and the second sensing unit 3 both are located at the left side). In this case, the processing unit 4 may determine that the user is holding the terminal device with the right hand based on the first angular velocity information of the first sensing unit 2 and the second angular velocity information of the second sensing unit 3.

Various embodiments of the present invention are described in detail hereinabove. However, it should be understood by those skilled in the art that, various modifications, combinations or sub-combinations may be made to these embodiments without departing from the concepts and spirits of the invention, and such amendments should fall within the scope of the present invention.

What is claimed is:

1. A terminal device, comprising:
    a housing configured to accommodate various components of the terminal device;
    a first sensing unit provided at a first position within the housing and configured to collect first status information of the terminal device;
    a second sensing unit provided at a second position within the housing and configured to collect second status information of the terminal device; and
    a processing unit configured to determine a manner that a user holds the terminal device based on both the first status information and the second status information,
    wherein the first position and the second position are different, and
    when an edge of the terminal device is held by a single hand, a distance from the first position to the single hand is different from a distance from the second position to the single hand, and the first status information is different from the second status information,
    wherein the processing unit determines that the edge of the terminal device is held by a left hand when it is determined that amplitude of movement of a right part of the terminal device due to a shake of a user's hand is bigger than amplitude of movement of a left part of the terminal device due to a shake of a user's hand based on both the first status information and the second status information; and that the edge of the terminal device is held by a right hand when it is determined that amplitude of movement of a left part of the terminal device due to a shake of a user's hand is bigger than amplitude of movement of a right part of the terminal device due to a shake of a user's hand based on both the first status information and the second status information,
    wherein the first sensing unit is a first gravity sensor, and the first status information is first acceleration information detected by the first gravity sensor; and the second sensing unit is a second gravity sensor, and the second status information is second acceleration information detected by the second gravity sensor.

2. The terminal device according to claim 1, wherein when determining the manner that the user holds the terminal device, the processing unit further determines a using state of the terminal device, and further determines the manner that the user holds the terminal device based on the using state.

3. A terminal device, comprising:
    a housing configured to accommodate various components of the terminal device;
    a first sensing unit provided at a first position within the housing and configured to collect first status information of the terminal device;
    a second sensing unit provided at a second position within the housing and configured to collect second status information of the terminal device; and
    a processing unit configured to determine a manner that a user holds the terminal device based on both the first status information and the second status information,
    wherein the first position and the second position are different, and
    when an edge of the terminal device is held by a single hand, a distance from the first position to the single hand is different from a distance from the second position to the single hand, and the first status information is different from the second status information,
        wherein the processing unit determines that the edge of the terminal device is held by a left hand when it is determined that amplitude of movement of a right part of the terminal device due to shake of the user's hand is bigger than amplitude of movement of a left part of the terminal device due to shake of the user's hand based on both the first status information and the second status information; and that the edge of the terminal device is held by a right hand when it is determined that amplitude of movement of a left part of the terminal device due to shake of the user's hand is bigger than amplitude of movement of a right part of the terminal device due to shake of the user's hand based on both the first status information and the second status information wherein:
        the first sensing unit is a first gyroscope, and the first status information is first angular velocity information detected by the first gyroscope; and
        the second sensing unit is a second gyroscope, and the second status information is second angular velocity information detected by the second gyroscope.

4. The terminal device according to claim 3 wherein: when determining the manner that the user holds the terminal device, the processing unit further determines a using state of the terminal device, and further determines the manner that the user holds the terminal device based on the using state.

* * * * *